United States Patent [19]

Kochenour

[11] 4,090,668

[45] May 23, 1978

[54] WINDSHIELD WASHER AND DEICER

[76] Inventor: Paul R. Kochenour, Box 270B, R.D. #2, Halifax, Pa. 17032

[21] Appl. No.: 747,932

[22] Filed: Dec. 6, 1976

[51] Int. Cl.² .......................... B60S 1/50; B60S 1/52; B05B 1/24
[52] U.S. Cl. .................................. 239/130; 15/250.04; 15/250.05; 219/202; 239/135; 239/284 R
[58] Field of Search ........... 239/129, 130, 135, 284 R, 239/284 A; 219/202, 203; 15/250 A, 250.01, 250.02, 250.04, 250.05, 250.4

[56] References Cited

U.S. PATENT DOCUMENTS

| 2,968,071 | 1/1961 | DiPerna | 239/284 |
| 3,243,119 | 3/1966 | Merkle | 239/284 X |
| 3,292,866 | 12/1966 | Benner | 239/130 X |
| 3,319,891 | 5/1967 | Campbell | 239/130 |
| 3,427,675 | 2/1969 | Tibbett | 15/250.04 |
| 3,571,560 | 3/1971 | Nilssen et al. | 219/202 X |
| 3,632,042 | 1/1972 | Goulish et al. | 239/130 |

FOREIGN PATENT DOCUMENTS

| 1,460,494 | 10/1966 | France | 239/284 |
| 1,909,956 | 9/1970 | Germany | 239/284 |
| 1,912,037 | 9/1970 | Germany | 15/250.04 |
| 1,114,232 | 5/1968 | United Kingdom | 239/284 |

Primary Examiner—Bruce H. Stoner, Jr.
Assistant Examiner—Andres Kashnikow
Attorney, Agent, or Firm—Schuyler, Birch, Swindler, McKie & Beckett

[57] ABSTRACT

A windshield washing and deicing system comprising a reservoir for containing washer fluid having a sealed container supported therein. A pump is effective to transfer washer fluid from the reservoir to the container and from the container to a plurality of nozzles located adjacent a vehicle window. A conduit is located in the reservoir for carrying heated engine coolant through the reservoir to heat the washer fluid therein. An electrical resistance wire is provided for further heating the washer fluid in the container whenever the temperature of the fluid in the container is below a predetermined minimum to quickly deice the vehicle window.

11 Claims, 4 Drawing Figures

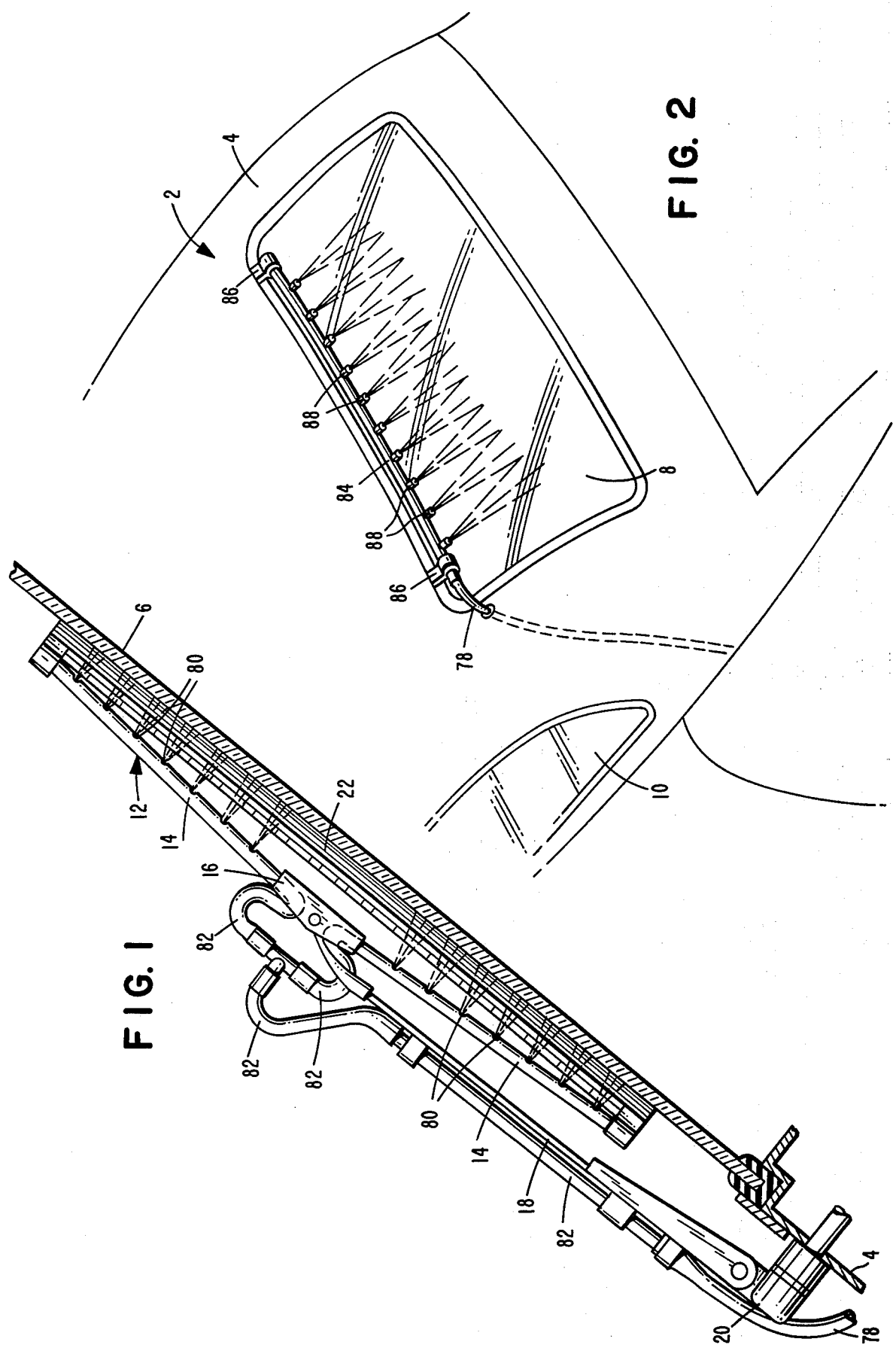

WINDSHIELD WASHER AND DEICER

BACKGROUND OF THE INVENTION

1. Field of the Invention

The present invention relates generally to windshield washing systems for motor vehicles such as automobiles and, more particularly, to a system for heating the washer fluid to deice either the windshield or some other vehicle window.

2. Description of the Prior Art

Automobile owners are often plagued during the winter with the problem of having a layer of ice deposited on the windshields of their vehicles by the weather conditions occurring at that time of the year. Such ice deposits are troublesome because they block the driver's vision thereby creating a safety hazard and because they are very difficult to remove. The driver must usually get out of the automobile into the cold winter weather to repeatedly scrape the windshield to clear it of ice. In addition, if the windshield wipers are embedded in the ice accumulation, any attempt to operate the wipers before clearing the wiper blades from the ice may result either in an overheated wiper motor or broken wiper linkages.

In an attempt to solve the problem of an iced-over windshield, various devices have been developed in the past to distribute a heated fluid onto the windshield to remove the ice. The fluid to be heated is often that fluid contained in the reservoir of the conventional windshield washing systems used in most cars today. Many of the prior art deicers heat the washer fluid by some type of a heat exchange relationship with the cooling liquid contained in the radiator or heater hose which has been warmed by passing through the engine. Such devices are generally shown in U.S. Pat. Nos. 3,243,119 to Merkle, 3,292,866 to Benner and 3,632,042 to Goulish. Other of the prior art deicers utilize an electrical heating means for warming the washer fluid to be distributed onto the windshield. Such devices are shown in U.S. Pat. Nos. 3,319,891 to Campbell and 3,427,675 to Tibbet, and also in the German Patent No. 1,909,956.

Those prior art deicers which utilize the heated engine coolant to heat the washer fluid have the disadvantage that, when the engine is first started and is cold, the washer fluid will not be heated promptly. Such a system is not effective to remove any ice from the windshield or to prevent the formation of ice until the engine gets hot enough by running for awhile to adequately heat the washer fluid by contact with the engine coolant; this may take up to 10 or 15 minutes in extremely cold weather. If the driver has to wait this length of time for the washer fluid to be heated, there is no time savings compared to the time it would take him to manually scrape the windshield clear of ice, or any significant advantage over the conventional defrosters on an automobile which are also effective in clearing ice from the windshield at about the same time, i.e., when the engine coolant becomes thoroughly heated.

The prior art devices which utilize an electrical means for heating the washer fluid, while not dependent on the engine coolant being hot to perform their heating function, have the disadvantage that there is a continuous drain on the vehicle battery or whatever other source of electrical power is being used to heat the fluid. Such a drain decreases the life expectancy of the vehicle battery and may result in the battery not having sufficient energy to start the car if the deicing system is used for a long period of time. In addition, such a continual drain on the battery puts an additional burden onto the charging system for recharging the vehicle battery, thereby decreasing its life expectancy. Of course, if one shuts off the deicing system to conserve the battery and the charging system of the car, then the salutary effect of the deicing system is lost and the driver is reduced to the traditional method of scraping the windshield.

SUMMARY OF THE INVENTION

Accordingly, it is an object of the present invention to overcome the above-noted disadvantages of prior art devices by providing a windshield washer and deicer which is effective to remove ice from a vehicle window before the vehicle engine is hot, but which also conserves the vehicle battery and does not impose an undue strain on the electrical system of the vehicle.

It is a further object of the present invention to provide a windshield washer and deicer which effectively deices a vehicle window a short period of time after starting the engine and which can alternatively be applied to either the front windshield or any of the other windows of the vehicle.

These and other objects of the present invention are provided by a windshield washer and deicer having nozzle means located adjacent a vehicle window for directing washer fluid against the window. The nozzle means comprise windshield nozzles formed by a plurality of holes in the support arms for the wiper blades, and also nozzles positioned adjacent the rear window of the automobile. A reservoir for containing the washer fluid is provided having a sealed container supported therein. The container is supplied by a pump with washer fluid from the reservoir, the outlet of the container being connected to the nozzles for distributing the washer fluid onto the vehicle windows.

The washer fluid in the reservoir is heated by a heat exchange conduit which circulates the heated engine coolant from the engine through the reservoir. In addition, the washer fluid in the container is heated by means of an electrical resistance wire which is effective to quickly heat the volume of fluid contained in the container since the container has a much smaller volume than the reservoir. This electrical heating means is operative only when the temperature of the fluid held in the container is below a predetermined minimum, in other words, only when the engine is still cold and the engine coolant is not yet effective to thoroughly heat the fluid in the reservoir. During this time, current from the vehicle battery energizes the resistance wire to heat the fluid in the container and thereby quickly deice the windshield.

A control panel is provided inside the automobile to be operated by the driver of the car. This panel has a first switch for energizing the resistance wire whenever a thermostatic switch senses an insufficient temperature in the container and a second switch for operating the pump to cause washer fluid to be distributed to the nozzle means. A third switch is also provided for selecting either the windshield nozzles or the rear window nozzles to receive washer fluid from the container.

BRIEF DESCRIPTION OF THE DRAWINGS

The novel features of the invention are set out with particularity in the appended claims, but the invention will be understood more fully and clearly from the following detailed description of a preferred embodiment of the invention as set forth in the accompanying drawings, in which:

FIG. 1 is a side elevational view of the windshield nozzles of the present invention;

FIG. 2 is a perspective view of the rear window nozzles of the present invention;

DESCRIPTION OF A PREFERRED EMBODIMENT

Figure 3:
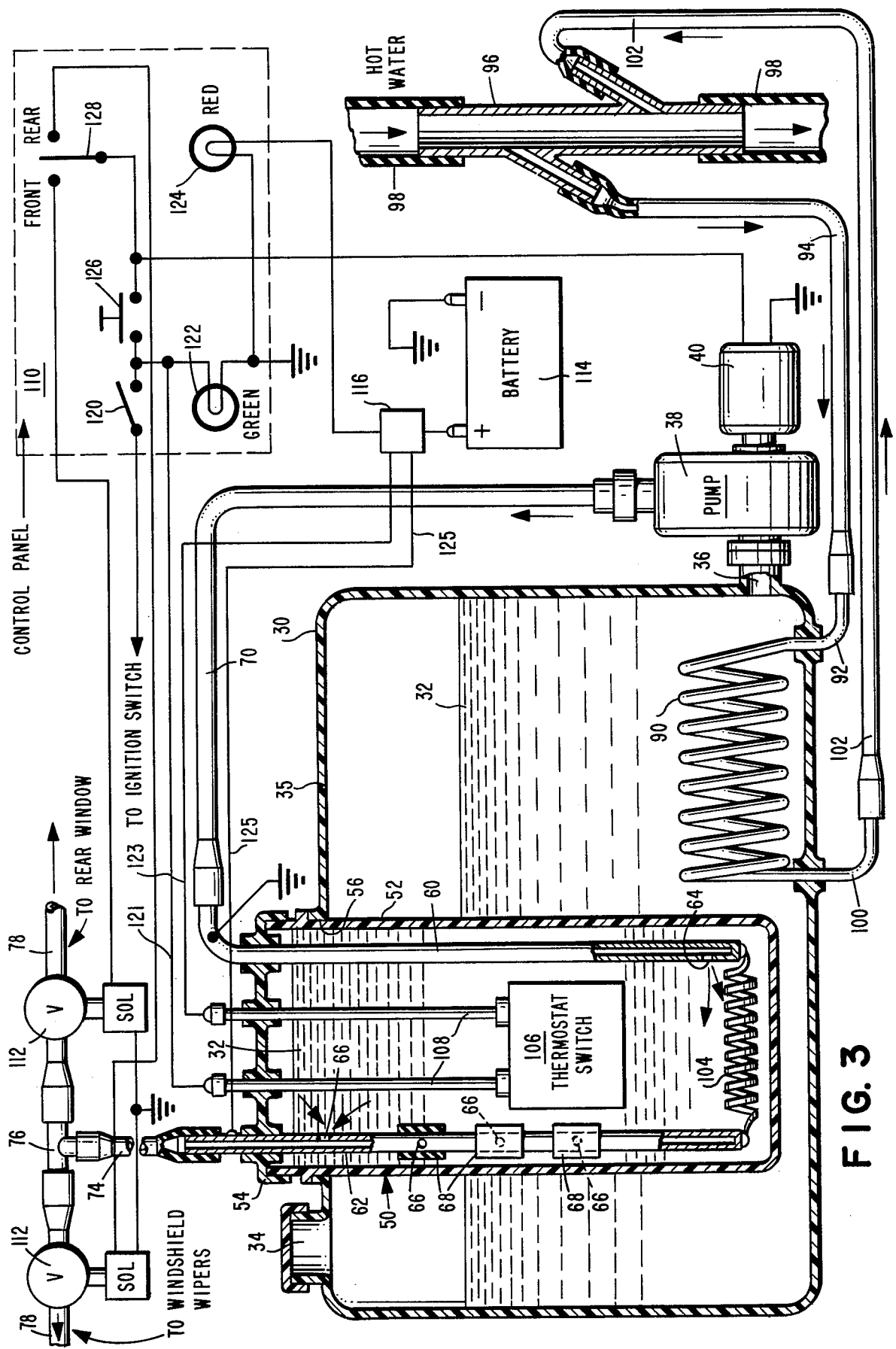
FIG. 3 is a diagrammatic view of a windshield washer and deicer according to the present invention.

Referring now to FIGS. 1 and 2, a conventional motor vehicle 2 comprises a body 4 having a front windshield 6, a rear window 8 and side windows 10. Windshield wipers 12 are usually provided for keeping windshield 6 cleared during inclement weather, such as rain storms, and for cleaning dirt off the surface of windshield 6 in conjunction with a washer fluid sprayed onto the windshield from a conventional windshield washing system. Such wipers 12 generally comprise two hollow, tubular support arms 14 joined together in the middle by a bracket 16. An operating arm 18 pivotally connects bracket 16 to the drive linkage 20 of a motor (not shown) for reciprocating the wipers 12 across the windshield 6. A rubber wiper blade 22 is carried by the support arms 14 and serves to clean the windshield 6 as the drive linkage 20 is operated. Although motor vehicle 2 will be illustrated herein as an automobile, the present invention may be used with any type of vehicle, such as an airplane, boat or hovercraft, having windows which must be wiped clean or otherwise cleared for unobstructed vision.

Referring now to FIG. 3, a windshield washer and deicer according to the present invention is illustrated having a main fluid reservoir 30 for containing a supply of washer fluid 32. Reservoir 30 is preferably the plastic, rectangularly shaped reservoirs generally provided in the conventional windshield washing systems of most automobiles today; the reservoir 30 being mounted underneath the hood of the automobile. Washer fluid 32 may be a solution composed of water, a suitable detergent and an antifreeze substance to prevent the fluid 32 from freezing during the winter. An inlet 34 is provided in the top surface 35 of the reservoir 30 so that washer fluid 32 may be added whenever it is necessary to replenish the supply of fluid contained in the reservoir 30. In addition, an outlet 36 is located in one of the side walls of the reservoir 30 adjacent the bottom thereof. A pump 38 driven by an electric motor 40 is attached to the outlet 36 for transferring the washer fluid 32 from reservoir 30 to its ultimate point of use as will be described hereafter.

A sealed container 50 having a cylindrical body 52 closed by a lid 54 is inserted into reservoir 30 through a circular hole 56 in the top surface 35 thereof and is glued or otherwise secured to the top surface 35. Most of the container 50 is supported inside the reservoir 30, but the top portion of container 50 including the lid 54 protrudes out of the reservoir to a point above the top surface 35. Container 50 preferably comprises a pint sized glass jar 52 closed by a screw-on metal lid 54, of the type commonly used in canning fruit, but it may also comprise other types of containers if desired.

Container 50 is provided with elongated inlet and outlet tubes 60 and 62, respectively, supported by the lid 54 and extending downwardly inside the container 50 to terminate slightly above the bottom of container 50. A small opening 64 is located in the inlet tube 60 adjacent its bottom for allowing the fluid contained in the inlet tube 60 to pass into container 50. Similarly, outlet tube 62 has a plurality of outlet holes 66 formed along its entire length with the lowermost holes 66 normally being covered by slideable rubber covers 68. In FIG. 3, the uppermost outlet hole 66 is shown uncovered, but any of the slideable rubber covers 68 could be moved to open any of the other outlet holes 66 if desired.

A hose 70 connects the inlet tube 60 in the container 50 to the outlet of pump 38 so that washer fluid may be transferred into, through and out of the container 50 as will be described hereafter. Outlet tube 62 in the container 50 is connected by means of a hose 74 to a T-connection 76, the branches of the T-connection 76 being connected respectively by other hoses 78 to nozzle means located adjacent various of the automobile windows for spraying washer fluid onto the windows. As shown in FIG. 1, windshield nozzles are provided by placing a plurality of holes 80 in the hollow support arms 14 for the windshield wiper blade 22; support arms 14 being connected by means of conduits 82 to a hose 78 carrying washer fluid from the container 50. Similarly, the nozzle means may include an elongated tube 84 held by clamps 86 to a position above the rear window 8 as seen in FIG. 2. In this case, the conduit 78 coming from the container 50 is connected to one end of the tube 84 and the other end is closed. Tube 84 has a number of jets or orifices 88 formed therein to act as rear window nozzles for spraying the washer fluid out onto rear window 8. An elongated tube similar to that shown in FIG. 2 may be placed adjacent any of the side windows 10 in the automobile if desired.

Reservoir 30 has a coiled length of tubing 90 supported therein for circulating or directing heated engine coolant into a heat exchange relationship with the washer fluid 32 contained in the reservoir 30. The inlet 92 of tubing 90 is connected by a hose 94 to a branched connection 96 inserted into a line 98 carrying the hot engine coolant from the engine. Line 98 may be either the radiator or heater hose. The outlet 100 of tube 90 is connected by hose 102 to another branch of connection 96 for returning the engine coolant to line 98 after passing through reservoir 30. A heating means 104 is also provided for heating the washer fluid held in the container 50. Heating means 104 preferably comprises a nichrome resistance wire connected between the lower ends of the inlet and outlet tubes 60 and 62 which are formed from a metallic substance such as copper to act as an electrical conductor for the resistance wire 104.

A thermostatic switch 106 is supported by means of support arms 108 from the lid 54 of the container 50 and extends downwardly until it rests inside the fluid held in the container. Thermostatic switch 106 may be any conventional switch having a spring-biased set point for selecting the temperature at which the switch will be actuated. By changing the spring biasing of switch 106, a different set point and a different actuation temperature for the switch can be selected. Support arms 108 for the thermostatic switch 106 are made from a metallic conductor and may be connected to a control panel 110 illustrated diagrammatically in FIG. 3.

Control panel 110 is provided in the interior of the car, preferably on the dashboard, so that it may be operated by the driver of the car. Panel 110 controls, in conjunction with thermostatic switch 106, the energization of the nichrome resistance wire 104, and it also can selectively direct the washer fluid from the container 50 to either the windshield nozzles 80 or the rear window nozzles 88. For the latter purpose, solenoid valves 112 are interposed in the hoses 78 carrying the washer fluid from the container 50 to the various nozzles; each of the solenoid valves 112 being suitably connected into the control panel 110.

All automobiles have a battery 114 which serves as a source of electrical power for the ignition process. Battery 114 also serves in the present invention as the source of current for the nichrome resistance wire 104. A relay 116 is connected to the control panel 110, the battery 114 and the thermostatic switch 106. When the relay 116 is actuated, it serves to pass current from the battery 114 to the nichrome wire 104 along the line 125 connecting the relay 116 to the outlet tube 62 of the container. Since the inlet and outlet tubes 60 and 62 of the container are electrical conductors, a current applied to outlet tube 62 from the battery 114 will energize the resistance wire 104 with the inlet tube 60 being appropriately grounded to the frame of the vehicle to complete the circuit. In addition, the electrical motor 40 for driving the pump 38 is connected to the control panel 110. It should be understood that the pump 38 is powerful enough to not only transfer washer fluid from the reservoir 30 into the container 50, but also from the container 50 to the various nozzles 80 and 88. However, a separate pump could also be utilized to transfer the washer fluid from the container 50 to the nozzles 80 and 88.

OPERATION. Assuming that the windshield 6 or rear window 8 has a coating of ice thereon which the driver of the automobile wishes to remove before driving the car, when the driver first gets into the car he can manually actuate a first switch 120 located on control panel 110 which is connected to the ignition system of the car. When switch 120 is closed, it allows the current in the ignition system to be directed along the line 121 to thermostatic switch 106 and also to light the green light 122 on control panel 110 indicating that the system is on. Since the washer fluid in the container 50 is initially cold, the thermostatic switch 106 will be actuated causing the current from the ignition system to pass through the thermostatic switch 106 and along another line 123 to actuate relay 116. When relay 116 is actuated, the current from the battery passes through relay 116 and along line 125 to the outlet tube 62 to energize the resistance wire 104 and to begin heating the fluid in the container 50. At the same time, a red light 124 on the control panel 110 is lighted indicating that the electrical heating system 104 is operating.

When the nichrome resistance wire 104 is energized by a battery 114, it will quickly heat the fluid contained inside the container 50 because of the small volume of the container. It will also begin heating the fluid held in the reservoir 30 by conduction through the walls of the glass jar 52 which comprises container 50. Outlet holes 66 in the outlet tube 62 are always placed above the level of the nichrome resistance wire 104 so that the resistance wire is always covered by fluid in the container 50. This is necessary to prevent resistance wire 104 from vaporizing which would occur if it were energized while not covered with fluid. Resistance wire 104 will continue heating the fluid until such time as thermostatic switch 106 trips indicating that the fluid has been heated to a predetermined minimum temperature. When the thermostatic switch 106 deactivates, relay 116 is opened to stop the flow of current from the battery 114 to the resistance wire 104 and also to extinguish the red light 124 on the control panel.

When the red light 124 on the control panel goes off, the operator knows that the fluid inside the container 50 has been heated to a sufficient degree. He can then manually actuate a second switch 126 on the control panel which energizes the pump motor 40 to begin pumping liquid from the reservoir 30 into the container 50 and from the container 50 to the nozzles. Depending on the amount of fluid initially present in reservoir 30, all of the fluid in both the reservoir 30 and the container 50 may have been initially heated to the proper temperature by the resistance wire 104 so that the thermostatic switch 106 is never reenergized even when new fluid from the reservoir 30 comes into the container 50. However, if any of the fluid coming into the container 50 is not at the proper temperature, it will lower the temperature of the fluid in the container 50 by dilution, thereby tripping switch 106 to reenergize the heating wire 104 to ensure that all of the fluid going to the nozzles is properly heated. As mentioned previously, since the container 50 has a very small volume in relation to the heating capacity of resistance wire 104, the wire 104 can quickly heat any of the fluid held in the container 50 to ensure that hot fluid is always dispensed to the nozzles. Control panel 110 also includes a third manually operated switch 218 for actuating one of the solenoid valves 112 to direct the washer fluid coming from container 50 to either the front windshield nozzles 80 or the rear window nozzles 88.

While the resistance wire 104 has been initially heating the fluid held in container 50, it should be remembered that the driver has also started the automobile engine which is warming up. As the engine gets hot thereby heating the engine coolant, the heated engine coolant will be passing through the hose 94, conduit 90 and return hose 102 to begin heating the fluid held in reservoir 30 by means of a heat exchange relationship with the heated coolant. Thermostatic switch 106 is preferably set to actuate at a temperature below the temperature to which the fluid in the reservoir 30 will normally be heated by the engine coolant. As soon as the coolant gets hot enough to maintain the fluid in the reservoir 30 at this temperature, thermosatic switch 106 will cause the electrical heating wire 104 to be shut off. Thus, the resistance wire heating system for the container is energized only so long as the heated engine coolant is unable to maintain the fluid in the reservoir at the proper temperature, thereby conserving the battery 114 and the charging system of the automobile by eliminating the need for the electrical heating system after the vehicle has been driven a short while. With a system according to that shown in FIG. 3, it has been found that the rubber wiper blades 22 can be melted free of half an inch of solid ice in approximately two minutes with the engine coolant being capable of heating the fluid in the reservoir to 155° F. and with the thermostatic switch being adapted to trip at 135° F.

Although container 50 has been shown as being supported inside reservoir 30, it should be apparent that it could be supported outside the reservoir in any desired position. In such a case, a separate pump might have to be provided for pumping the fluid from the container to the nozzles although one pump, if of sufficient capacity might still suffice. There would also be no indirect heating by condution between the reservoir 30 and the container 50. However, the thermostatic switch 106 would still sense the temperature of the fluid entering container 50, and would shut down the electrical heating system 104 whenever the temperature of that fluid is over the set point of the switch 106, thereby conserving the drain on the electrical system in the same manner as if the container were still inside the reservoir.

Figure 4:
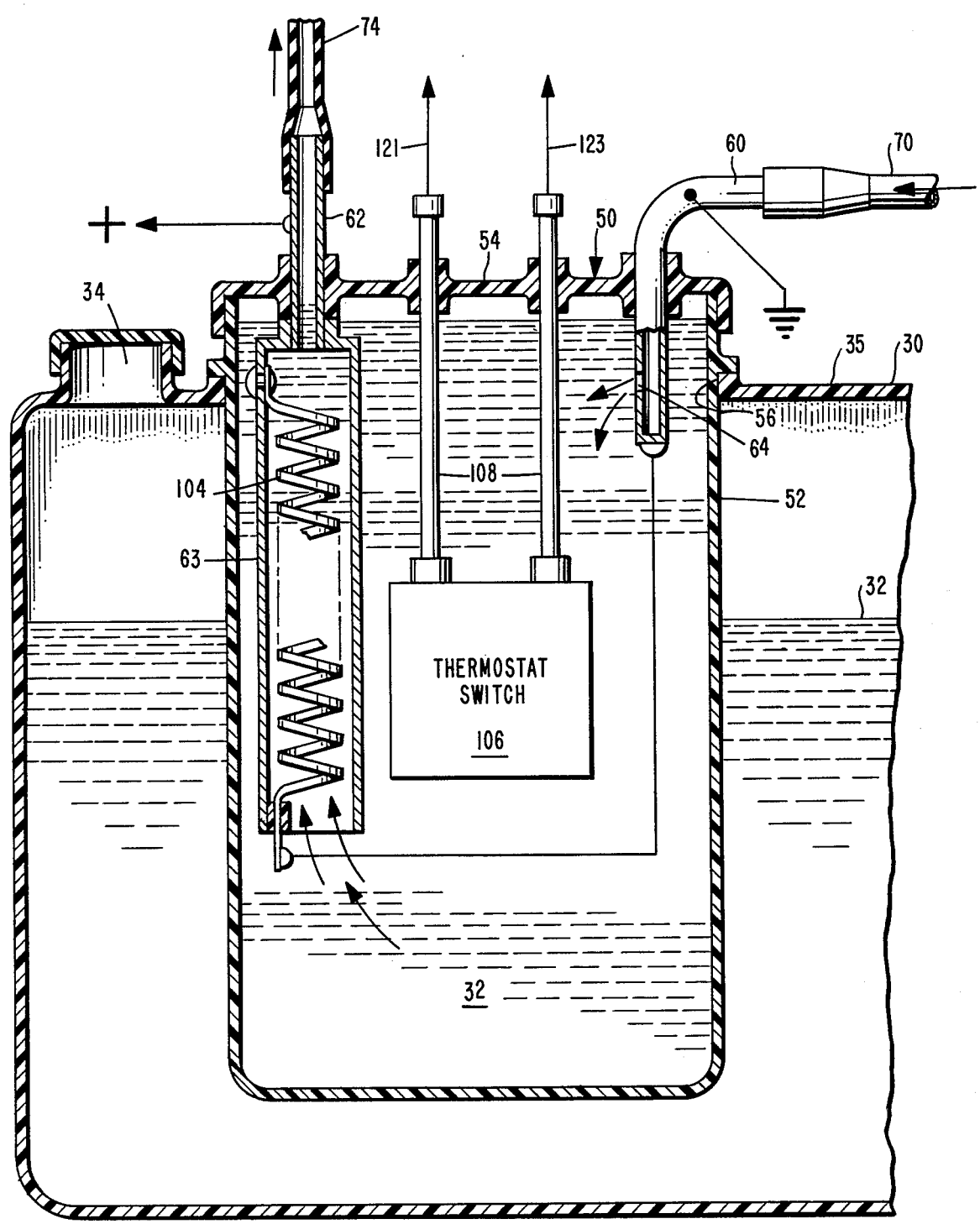
FIG. 4 is a partial cross-sectional view of a second embodiment of the windshield washer and deicer of the present invention.

An alternative embodiment of the invention is illustrated in FIG. 4 with similar reference numbers being applied to parts which are common to the embodiment of FIG. 3. The primary difference between the embodiment of FIG. 4 and that described previously is that the outlet tube 62 in the container now has an enlarged bottom end 63 in which the electrical resistance wire 104 is mounted. This serves to ensure that all of the fluid going to the nozzles 80 and 88 is thoroughly heated before departing the container 50. When two nichrome resistance wires are mounted in the enlarged lower end 63 of outlet tube 62, it has been found that the time required to melt the wiper blades free of a half inch of solid ice was reduced to 90 seconds.

Although the present invention has been illustrated in terms of a preferred embodiment, it will be obvious to one of ordinary skill in the art that numerous modifications may be made without departing from the true spirit and scope of the invention which is to be limited only by the appended claims. For example, it might be possible to dispense entirely with the provision of a separate sealed container although such container is preferable. In such a case, the auxiliary electrical heating means could be inserted directly into the fluid in the reservoir and would be effective only so long as the engine coolant did not maintain the fluid in the reservoir at a sufficient temperature.

I claim:

1. A window washing system for a motor vehicle having a battery and a liquid cooling system for the motor in which the cooling liquid becomes warm as a result of heat exchange with the motor, comprising:
    (a) nozzle means located adjacent a vehicle window for directing washer fluid against the window;
    (b) a reservoir for containing washer fluid;
    (c) a container having an inlet connected to said reservoir and an outlet connected to said nozzle means;
    (d) pumping means for transferring washer fluid from said reservoir into said container and from said container to said nozzle means;
    (e) means for circulating the warm cooling liquid from the motor cooling system into a heat exchange relationship with the washer fluid inside said reservoir to thereby heat the fluid; and
    (f) means for heating the washer fluid in said container when the temperature of the washer fluid in said container is less than a predetermined minimum.

2. The window washing system of claim 1 wherein said container has a volume substantially less than the volume of said reservoir.

3. The window washing system of claim 1 wherein said heating means for said container comprises an electrical resistance wire, and further including control means for energizing said wire.

4. The window washing system of claim 3 wherein said control means includes a relay connected between said wire and the vehicle battery, a thermostatic switch placed in the washer fluid in said container and connected to said relay, said switch actuating said relay to allow current to flow to said wire from the battery when the temperature of the washer fluid in said container is below said predetermined minimum.

5. The window washing system of claim 1 wherein said circulating means for the cooling liquid comprises a conduit placed inside said reservoir, said conduit being connected to a hose carrying the warm cooling liquid from the motor cooling system.

6. The window washing system of claim 1 wherein said container is supported inside said reservoir.

7. The window washing system of claim 1 wherein said nozzle means comprises nozzles located adjacent the windshield, said windshield nozzles comprising holes located in the support arms of each of the windshield wiper blades.

8. The window washing system of claim 7 wherein said nozzle means further comprises nozzles located adjacent the rear windows.

9. The window washing system of claim 8 further including a control means for directing washer fluid to either said windshield nozzles or said rear window nozzles.

10. The window washing system of claim 9 wherein said control means includes a solenoid valve associated with each of said windshield and rear window nozzles, and a manually operated switch connected to said solenoid valves for selectively opening one of said valves to allow the washer fluid to pass therethrough.

11. The window washing system of claim 1 wherein said outlet comprises an elongated tube having an enlarged lower end forming a hollow cylinder, and said heating means for said container comprises at least one electrical resistance wire mounted on said enlarged lower end.

* * * * *